United States Patent [19]

Griner et al.

[11] 4,219,244
[45] Aug. 26, 1980

[54] FAULT DETECTOR FOR WHEEL SLIP CONTROL SYSTEM

[75] Inventors: Paul K. Griner, Maryland Heights; Joseph E. Fleagle, St. Louis, both of Mo.

[73] Assignee: Wagner Electric Corporation, St. Louis, Mo.

[21] Appl. No.: 903,705

[22] Filed: May 8, 1978

[51] Int. Cl.² ............................................. B60T 8/00
[52] U.S. Cl. ...................................... 303/92; 303/97
[58] Field of Search .......................... 303/92, 97, 106; 340/52 B

[56] References Cited

U.S. PATENT DOCUMENTS

| | | | |
|---|---|---|---|
| 3,920,284 | 11/1975 | Lane | 303/92 |
| 3,988,599 | 10/1976 | Fleagle | 303/97 |
| 4,013,324 | 3/1977 | Quon | 303/92 |

Primary Examiner—Trygve M. Blix
Assistant Examiner—Reinhard J. Eisenzopf
Attorney, Agent, or Firm—Eyre, Mann, Lucas & Just

[57] ABSTRACT

A memory circuit increments when sensor fallout or short solenoid energization is detected in a wheel slip control system. A disable or alarm signal is generated when the memory contents reach a predetermined threshold.

21 Claims, 6 Drawing Figures

FAULT DETECTOR FOR WHEEL SLIP CONTROL SYSTEM

BACKGROUND OF THE INVENTION

Wheel slip control systems are employed most commonly on articulated highway vehicles to shorten stopping distance and to permit directional control of the vehicle even in panic stops. Wheel slip control systems usually operate by sensing conditions of speed and/or acceleration which are normally indicative of an existing or incipient skid condition. Upon having detected a skid condition, the wheel slip control system operates one or more electric solenoids in the vehicle brake line which modify the fluid pressure being applied to the brakes. The modification of fluid pressure is a temporary reduction in the fluid pressure applied to the brakes in order to permit the skidding wheel to spin up to approximately vehicle speed.

Wheel slip control systems, such as those disclosed in U.S. Pat. Nos. 3,840,816; 3,988,599 and 3,842,355, incorporated herein by reference, employ wheel speed sensors which generate an alternating signal whose frequency varies in proportion to the wheel rotational speed. A wheel speed signal processor converts the variable-frequency wheel speed signal into a dc velocity signal whose amplitude is proportional to the frequency of the wheel speed signal. Logic circuits decide whether the characteristics of the velocity signal, in some cases including the acceleration content, are characteristic of a wheel skid and, if so, generate an electrical output signal which energizes one or more solenoids to provide relief of braking pressure.

There are a number of malfunction conditions afflicting wheel slip control systems which may interfere with proper operation of the braking system or may permanently damage the wheel slip control system. One such malfunction condition is the long-term energization of a solenoid valve rather than its normal intermittent actuation. Since the solenoid valve reduces braking pressure, its long-term energization due to system faults can excessively reduce the desired application of braking force and can vent excessive quantities of fluid pressure sometimes exceeding the capacity of the pressure source. U.S. Pat. Nos. 3,842,355 and 3,988,599 disclose a timer which received the energization signal of one or more solenoids. If the solenoids remain continuously energized longer than a predetermined time, the timer triggers a crowbar circuit which blows a system fuse to disable the wheel slip control system and return control of braking to its normal manual mode.

Certain types of wheel speed sensors have a malfunction mode which produces a cyclic variation in output frequency when no variation in wheel speed in fact exists. One such malfunction exhibits a complete loss of signal over a portion of the revolution of the wheel. This may occur, for example by axial misalignment of the rotating element of the wheel speed sensor which causes the space between the fixed and rotating members to cyclically move into and out of effective working range. When the members move out of working range, the wheel speed signal suddenly changes to zero and then resumes after a short delay.

The logic circuit interprets this abrupt change in wheel speed signal as a large deceleration which signifies a skid and applies an energization signal to the solenoid. The abrupt resumption of the wheel speed signal is interpreted by the logic circuit as the end of the skid. The logic circuit thereupon deenergizes the solenoid.

This type of malfunction typically occurs at least once per wheel revolution and usually persists for a short time per cycle. Cyclic energization of the solenoid by this type of signal not only vents excessive quantities of fluid pressure but may also rapidly lead to destruction of the solenoid.

U.S. Pat. No. 4,036,537 attempts to solve the problem of the spurious cyclic sensor signal by gating the cyclically varying velocity-derived signal with a second signal generated in the logic circuit from a combination of signals relatively immune to velocity signal dropouts. The gate blocks the velocity-derived signal from the solenoid until the first occurrence of the second signal whereupon a timer enables the gate for a predetermined period thus permitting actuation of the solenoid by the velocity-derived signal even though it may contain sensor noise. The second signal may be of the type disclosed in U.S. Pat. No. 3,988,599.

A different approach to solving the problem of cyclic sensor fallout was disclosed in U.S. Pat. No. 4,013,324. In this patent, a timer is started by the onset of energization of a solenoid. The termination of energization is normally operative to reset the timer. A short-pulse discriminator is effective to prevent solenoid energization pulses shorter than a predetermined length from being effective to reset the timer at their termination. The timer is thereby permitted to complete its timing cycle and generate a disabling signal.

SUMMARY OF THE INVENTION

The present disclosure teaches a sensor fallout detector for use with a wheel slip control system. Each time the brake-release solenoid is energized, an increment of signal is stored in a memory device. If the solenoid energization and the sensor outputs have the characteristics of normal actuation of the wheel slip control system, an erase signal is generated at the end of the solenoid energization to erase the contents of the memory device. Conversely, if characteristics of a number of different malfunctions are detected, no erase signal is generated. The memory device retains the increment of signal. Upon repeated detections of the malfunction, the contents of the memory device builds up to a threshold quantity which triggers an output signal which may be used to operate a warning device such as a light or bell or may be connected to temporarily or permanently disable the wheel slip control system.

In an analog embodiment of the system, a memory device stores a signal proportional to the energization time of the wheel slip control solenoid valve. If the wheel slip control solenoid valve is continuously energized for longer than a predetermined period, the memory device stores sufficient signal to trigger a threshold detector which generates an output signal which may appropriately be used to signal a warning or disable the wheel slip control system. In practical embodiments, the wheel slip control solenoid valve is limited to an energization time of suitably 1.6 seconds per cycle. The period of the memory device is established to be longer than one maximum normal cycle of energization of the solenoid valve. In the case of a normal maximum energization time of 1.6 seconds, a memory device time period of suitably 2.2 seconds may be appropriate.

At the end of each normal solenoid energization, a reset pulse generator is triggered into generating a reset pulse which erases the signal stored in the memory device in preparation for the next solenoid cycle.

A timer inhibits the operation of the memory reset in the event of a solenoid energization of less than a predetermined time. The applicant has discovered that normal solenoid energizations in practical wheel slip control systems persist for at least 60 milliseconds or more. In one embodiment, a solenoid energization of less than 60 milliseconds permits the timer to inhibit the operation of the memory reset and consequently permits the accumulation of an increment of signal in the memory. In addition, the applicant has discovered that, for most faults due to sensor fallout, the resulting spurious solenoid energization persists less than about 10 milliseconds beyond the end of detected sensor fallout. In response to this, the applicant teaches an embodiment of the invention in which a solenoid energization in the presence of sensor fallout which continues for less than 20 milliseconds beyond the end of the detected sensor fallout inhibits the memory reset.

As the memory device collects increments of signal from repeated solenoid energizations accompanying detections of sensor fallout or repeated short solenoid energizations, the signal stored in the memory is increased toward a threshold. The threshold is established at a value which will be exceeded by suitably 2.2 seconds of continuous solenoid energization. In the case of cyclic detected faults due to sensor fallout, the memory is incremented in proportion to the solenoid energization time of each spurious energization. If a reset signal fails to be generated before the memory accumulates a signal sufficient to trigger the threshold, the threshold generates an output signal which is thereupon useful to provide an alarm or to disable the control circuit either temporarily or permanently.

The memory contains a forgiveness circuit which slowly drains off the stored signal. The forgiveness circuit permits momentary faults in the system arising, for example, from the connection or rearrangement of cables or momentary faults due to road shock and the like, to be slowly erased from the memory. For example, in an analog embodiment of the invention, the forgiveness circuit has a discharge time constant of about 32 seconds as compared to a charge time constant of 2.2 seconds.

DETAILED DESCRIPTION OF THE PREFERRED EMBODIMENT

Figure 1:
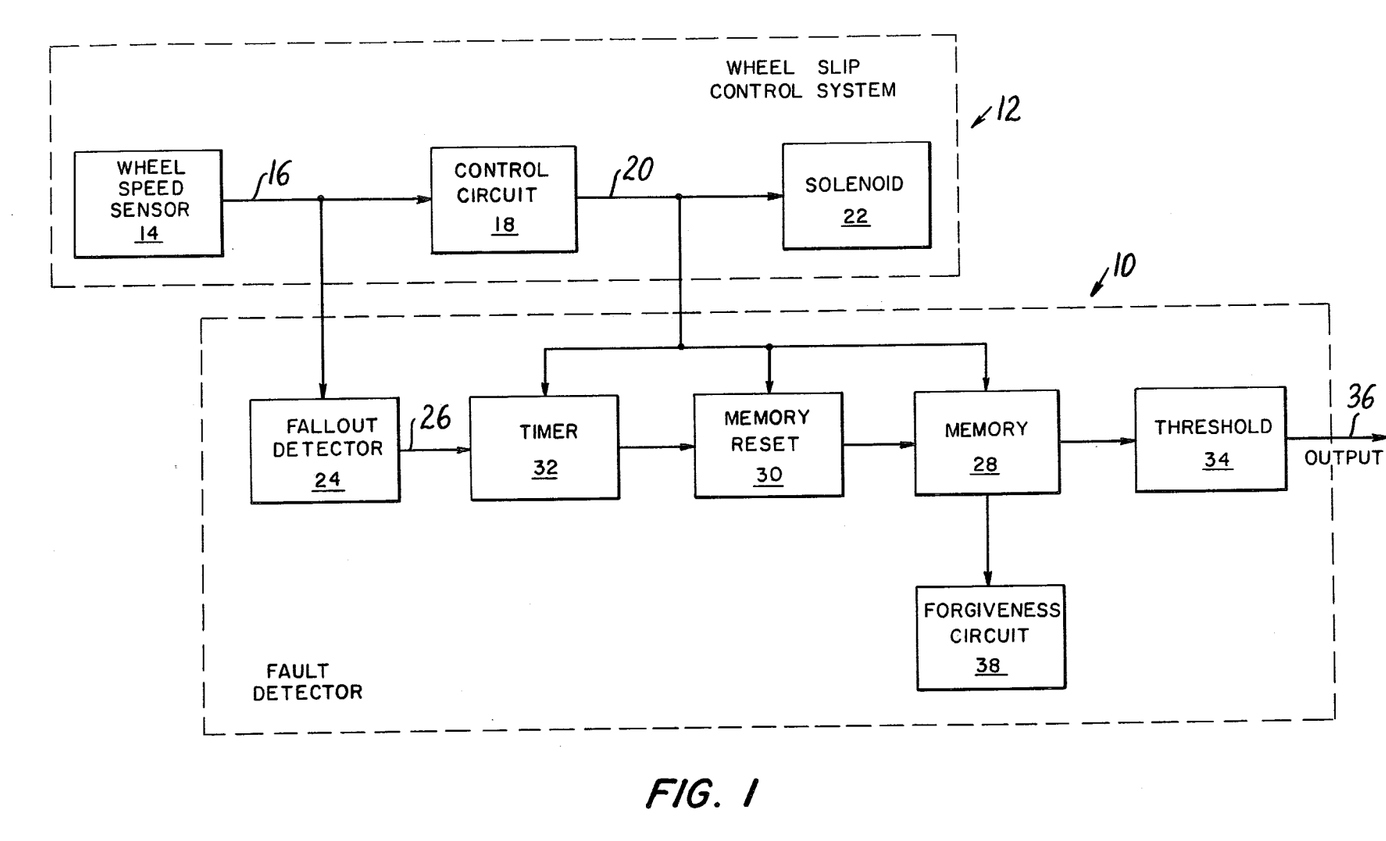
FIG. 1 shows a simplified block diagram of the invention.

Referring now to FIG. 1, there is shown generally at 10 a fault detector according to the present invention operatively connected to a wheel slip control system shown generally at 12. The wheel slip control system may be of any type known in the art such as, for example, that taught in U.S. Pat. Nos. 3,951,467; 3,827,760 or 3,911,392.

A wheel speed sensor 14 generates an electrical signal on its output line 16 which varies according to the rotational speed of the wheel of the vehicle. In one type of wheel speed sensor 14, a toothed wheel rotating with the vehicle wheel passes a sensor located closely adjacent to one point on the perimeter of the toothed wheel. The sensor generates an alternating signal whose frequency is variable according to the speed of the wheel rotation. The variable frequency wheel speed signal is normally converted to a dc signal whose amplitude is variable in proportion to the wheel speed. In the description which follows, it is assumed that the signal on line 16 is a variable dc signal whose amplitude is variable in dependency upon the rotational speed of the vehicle wheel being measured.

The wheel speed signal is connected on line 16 to an input of a control circuit 18. The control circuit 18 senses properties in the wheel speed signal from which it decides whether or not a skidding situation is occurring. When the control circuit 18 decides that a skidding situation is occurring or imminent, it places a solenoid energization signal on its line 20 which is connected to solenoid 22. For the duration of the control signal on line 20, the solenoid 22 operates on the brake pressure being fed to the vehicle brakes to reduce the braking pressure and thereby to permit the spin-up of the wheels. The wheel speed sensor 14 detects this spin-up and, the control circuit 18 decides that the skidding situation is at least temporarily alleviated and deenergizes the solenoid 22. In a protracted skid, this cycle of events can repeat a number of times until the vehicle is brought to a stop. Under normal circumstances, the output signal from the control circuit 18 is limited to a fixed maximum length which, in the referenced wheel slip control systems, is approximately 1.6 seconds. The solenoid energization is usually significantly less than 1.6 seconds, but due to the inertia of the wheel and the time delays in effecting the release of brake pressure using the solenoid 22, a normal cycle of the wheel slip control system will require at least 60 milliseconds to complete. When the signal on line 20 endures for less than 60 milliseconds, it is good evidence that the signal is due to a spurious source either in the wheel speed sensor 14, intermittent cables or in the control circuit 18.

The wheel speed signal on line 16 is connected to a fallout detector 24 in fault detector 10. It is the function of the fallout detector 24 to determine that a spurious signal is being generated by the wheel speed sensor 14 which could be interpreted by the control circuit 18 as an indicator of a skidding condition. For example, an excessively high acceleration of deceleration component in the wheel speed signal is interpretable by one embodiment of fallout detector 24 as an indicator of sensor fallout. This arises due to the fact that the acceleration or deceleration of a real wheel speed signal is limited by the inertia of the wheel and by the ability of either the brakes or the wheel-road contact to slow down and/or speed up the wheel. Consequently, accelerations or decelerations unrealistically large, for example, 20 G's, are likely due to faults in the sensor or cables. The fallout detector 24 may produce a signal on its output line 26 when high accelerations or deceleration are detected. Other types of fallout detectors which may suitably be used in fallout detector 24 include detectors which sense a speed difference between two or more monitored wheels exceeding a fixed threshold, or those in which the time period between the appearance of a deceleration signal and the appearance of the following acceleration signal is excessively short. Fallout detectors 24 of these types are described later in the specification.

The solenoid energization signals on line 20 in wheel slip control system 12 are connected to a memory 28. The memory 28 stores a signal each time the solenoid energization signal appears. In a solenoid energization for which the normal criteria are met, the memory reset 30 is triggered by the end of the solenoid energization signal to generate a reset signal which cancels the signal stored in memory 28.

Timer 32 inhibits the operation of the memory reset 30 unless certain criteria for solenoid energization time and fallout detection are satisfied.

After repeatedly storing increments of signal without an intervening reset, memory 28 eventually stores enough signal to exceed the level established by a threshold 34. When this occurs, threshold 34 generates an output signal on its output line 36 which may be used to generate an alarm or disable the control circuit 18. Such use of a fault signal is well known in the art and will not be further detailed.

A forgiveness circuit 38, connected to memory 28, slowly bleeds off the signal stored in memory 28 at a rate much slower than the accumulation rate during repeated spurious solenoid energizations. For example, a forgiveness circuit to be described has a time constant of 32 seconds as compared to the time constant for feeding the memory 28 of 2.2 seconds.

Figure 2:
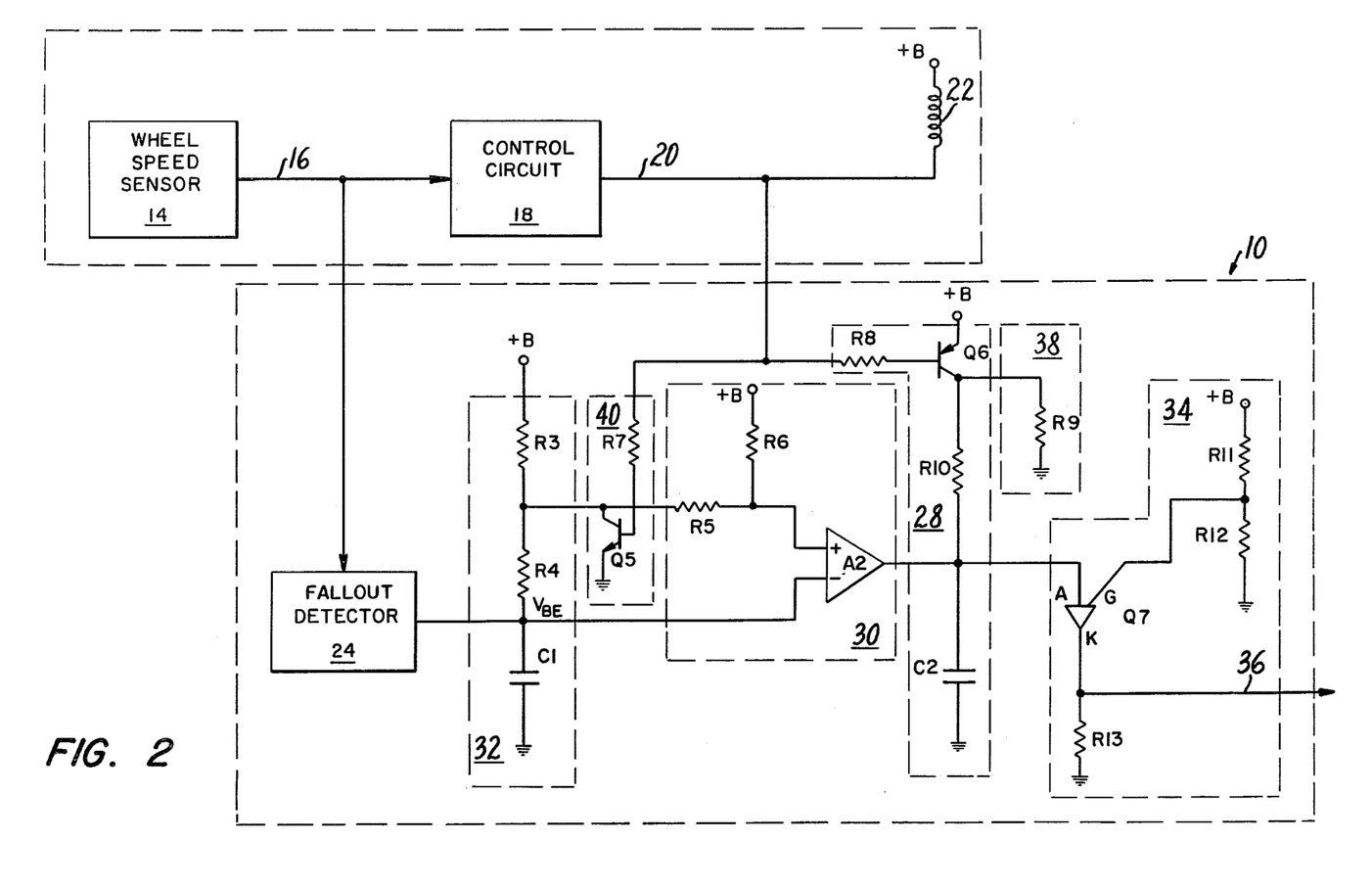
FIG. 2 shows a partially schematic, partially block diagram of an embodiment of the invention.

Referring now to FIG. 2 in which like numerals refer to the same elements, the timer 32 consists of a capacitor C1 arranged to charge through resistors R3 and R4 from supply voltage B to ground. The output of the fallout detector 24 is normally a high impedance but changes to a low impedance to ground in the presence of a detected sensor fallout. Consequently, in the absence of a detected sensor fallout, fallout detector 24 does not interefere with the charging of capacitor C1.

In the absence of a solenoid energization signal, which is suitably a ground signal, the positive voltage fed through the very low resistance of solenoid 22 and R7 to the base of transistor Q5 in switch 40 saturates transistor Q5 and maintains the junction of resistors R3 and R4 at approximately ground potential. Consequently, in the absence of solenoid energization, capacitor C1 is maintained discharged through resistor R4 and the collector to emitter junctions of Q5.

A voltage divider composed of resistors R5 and R6 in memory reset 30 maintains the positive input of circuit A2 at a fixed positive value while Q5 is in the saturated condition. The negative input of circuit A2 is taken from the junction of R4 and C1. This point is normally maintained at about zero volts due to the discharge path for C1 through R4 and the collector-emitter path of Q5. Consequently, the positive input of circuit A2 is normally maintained positive with respect to the negative input of A2 and its output is normally maintained in the high impedance condition. Whenever the negative input of circuit A2 becomes more positive than its positive input, by means which will be explained, the output of circuit A2 changes to low impedance to ground.

The resistance of solenoid 22 is very low compared to the resistance of R7 in series with the base connection on transistor Q5. Consequently, the junction of solenoid 22 and R7 is very close to +B. This voltage is fed through R8 to the base of transistor Q6 in memory 28. This voltage at the base of Q6 cuts off Q6 and prevents charging of memory capacitor C2 through R10. Any residual charge which may reside in memory capacitor C2 is slowly bled off through R10 and the very high resistance of R9 in forgiveness circuit 38.

A programmable unijunction transistor Q7 is connected to the junction of C2 and R10 thus receiving at its anode connection the signal stored in memory capacitor C2. The cathode lead of programmable unijunction transistor Q7 is connected through R13 to ground and via output line 36 to the using circuits. A voltage divider comprising resistors R11 and R12 generate a voltage at their junction which is fed to the gate lead of programmable unijunction transistor Q7. When the voltage in memory capacitor C2 rises to equal or exceed the voltage at the gate of programmable unijunction transistor Q7, Q7 turns on and permits the discharge of memory capacitor C2 through R13. The resulting signal at the junction of the cathode lead of Q7 and R13 is connected on the output line 36 which may be used, for example, the trigger a crowbar circuit which blows a fuse and thereupon disables the control circuit 18.

In normal operations without sensor fallout or short solenoid energization, a solenoid energization on line 20 cuts off transistor Q5 in switch 40 and saturates transistor Q6 in memory 28. The resistance of R3 is very small compared to the resistance of R4. With Q5 cut off, the positive voltage at the positive input of circuit A2 rises to approximately B. Capacitor C1 begins charging through R3 and R4. In a normal solenoid energization, the capacitor C1 will charge to approximately voltage B.

During the solenoid energization signal on line 20, saturated transistor Q6 permits memory capacitor C2 to charge through R10.

At the end of the solenoid energization signal on the line 20, Q5 is again saturated and Q6 is cut off. The voltage at the positive input to circuit A2 immediately drops to the value established by voltage divider R5 and R6. If the voltage stored in C1 exceeds the voltage established by voltage divider R5 and R6, the negative input to circuit A2 is more positive than its positive input. Consequently, a low impedance discharge path for the charge stored in memory capacitor C2 is provided through circuit A2.

If the solenoid energization signal on line 20 is shorter than a predetermined time, suitably 6–100 milliseconds, and preferably from about 10 to about 40 milliseconds, capacitor C1 becomes insufficiently charged through R3 and R4 to equal the normal voltage at the positive input to circuit A2. Consequently, at the end of such a short solenoid energization, there is insufficient charge stored in capacitor C1 to trigger memory reset 30 into erasing the charge stored in memory capacitor C2. With capacitor Q6 cut off at the end of the solenoid energization, the charge stored in memory capacitor C2 remains stored therein and subsequent energizations of the solenoid without an intervening reset will eventually build up a charge in memory capacitor C2 sufficient to trigger threshold 34.

In the sensor fallout during solenoid energization, C1 is prevented from beginning to charge by the low impedance of fallout detector 24 until the sensor fallout terminates. After termination of sensor fallout, charging of C1 must continue for from about 6 to about 100 milliseconds, and preferably from about 10 to about 40 milliseconds before reset is enabled.

Figure 3:
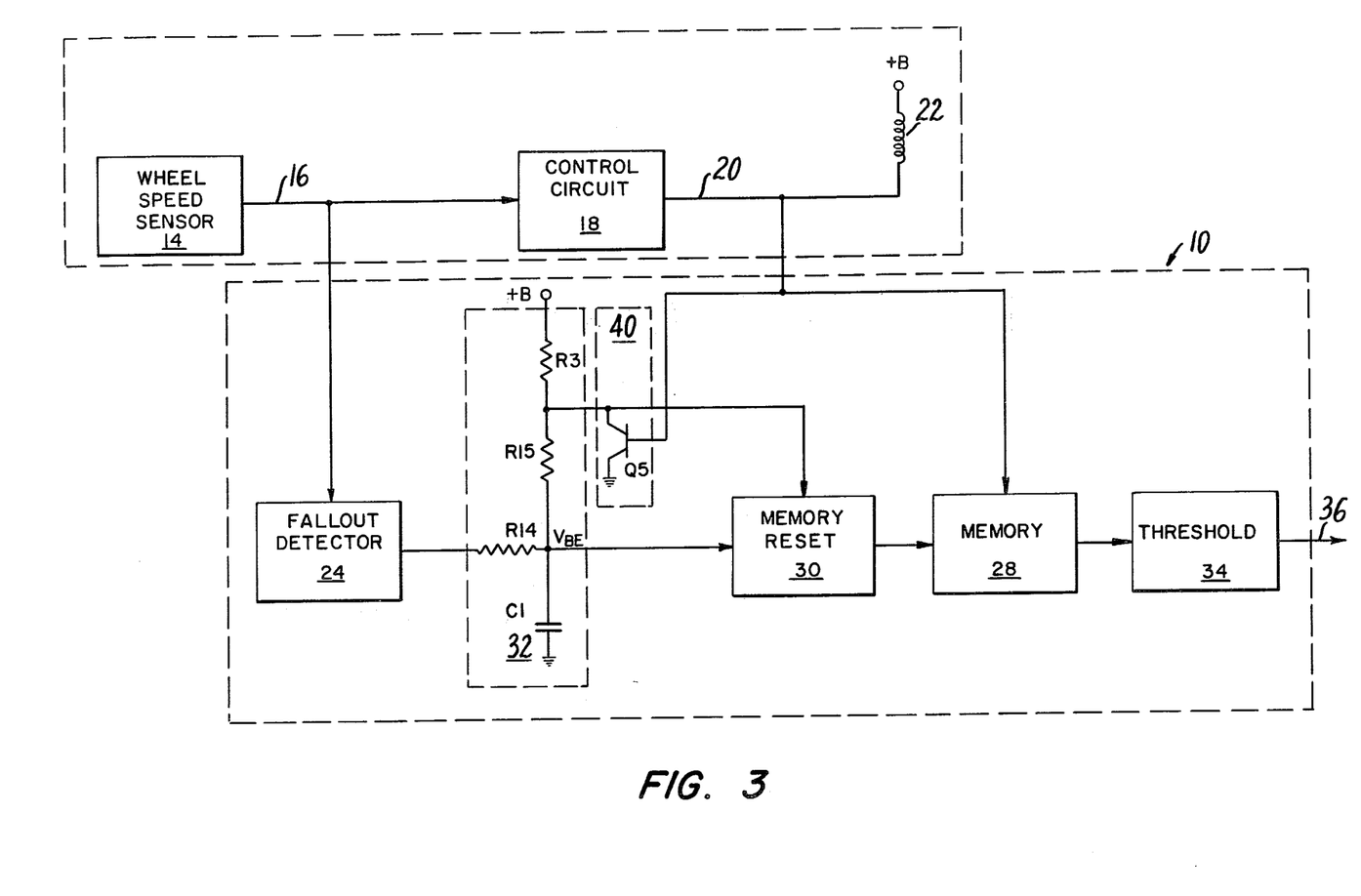
FIG. 3 shows a partially schematic, partially block diagram of a second embodiment of the invention.

A second embodiment of the invention is shown in FIG. 3. This embodiment places additional limitations on the relationship between the solenoid energization pulse and the timing of the sensor fallout. Without detected sensor fallout, capacitor C1 charges through resistors R15 and R3 as previously described. If sufficient charge is stored in capacitor C1 by the end of solenoid energization, memory reset 30 is enabled to generate a reset signal for memory 28.

If sensor fallout is detected by fallout detector 24 during a solenoid energization, resistor R14 is effectively connected to ground through fallout detector 24 in parallel with capacitor C1. Resistors R14, R15 and R3 form a voltage divider which limits the charge on capacitor C1 less than the value which would enable a reset signal to be generated as long as fallout detector 24 presents a low impedance output. Consequently, even in the presence of a relatively long solenoid energization which is accompanied by detected sensor fallout, capacitor C1 is charged only to an intermediate voltage but is kept from fully charging. If the detected sensor fallout terminates before the end of solenoid energization, the voltage divider path through R14 is terminated and C1 is permitted to again charge from its intermediate voltage through R3 and R15 toward a value sufficient to enable memory reset 30. The time for C1 to charge from its intermediate voltage to its enabling value is suitably selected at about 20 milliseconds. Thus, if the time from the end of detected sensor fallout 24 until the time of the end of solenoid energization exceeds about 20 milliseconds, the charge stored in C1 is enabled to build up sufficiently to permit resetting of the memory 28.

Figure 4:
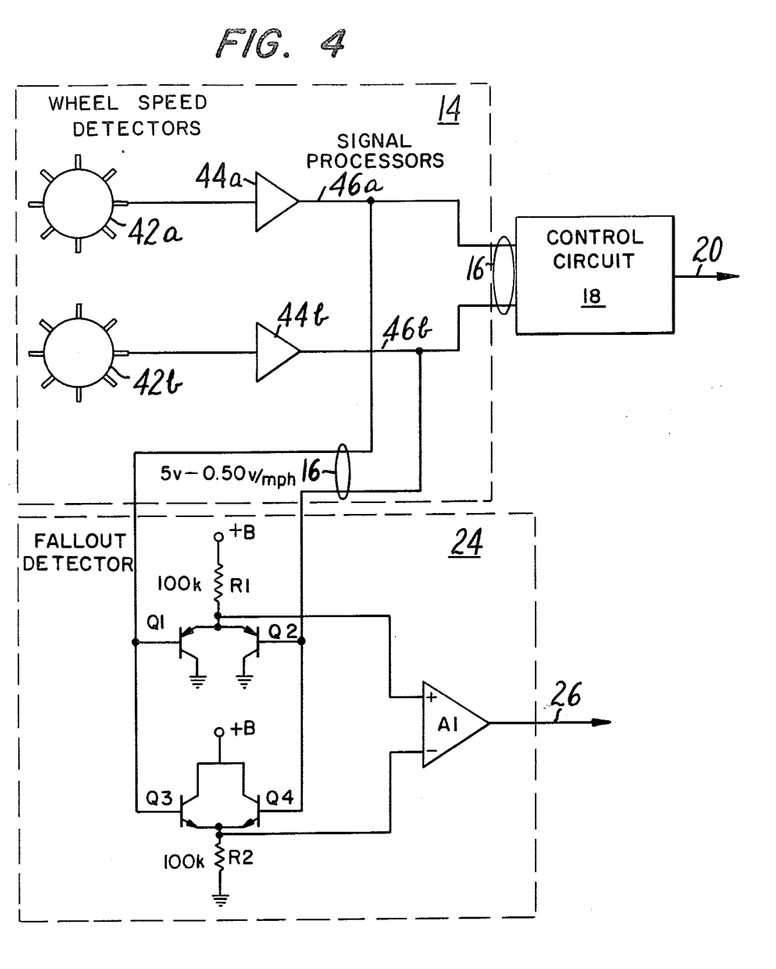
FIG. 4 shows a schematic diagram of a fallout detector which depends upon excessive speed difference between two monitored wheels.

Referring now to FIG. 4, there is shown one embodiment of a fallout detector which is sensitive to differences in wheel speed between the two monitored wheels.

Wheel speed detectors 42a, 42b generate signals whose frequencies are dependent upon the rotational speed of the wheels with which they are associated. The frequency-varying signals are connected to inputs of signal processors 44a, 44b which change the frequency-varying signals into amplitude varying dc signals on output lines 46a, 46b respectively. The two output signals are connected to control circuit 18 as well as to fallout detector 24.

For purposes of example, and not as limitation, it is assumed that the output of signal processors 44a, 44b are scaled at −50 mv/mph and that the zero speed reference is five volts. Consequently, for increases in wheel speed, the signals on output lines 46a, 46b will decrease from five volts at the rate of −50 mv/mph. The circuit comprised of transistors Q1 and Q2 with R1 selects the lower voltage $V_1$ comprising the higher speed signal on the two lines and connects it plus one base-emitter drop in transistor Q1 or Q2 to the positive input terminal of circuit A1. Similarly, the circuit comprised of transistors Q3 and Q4 with R2 selects the higher of the two voltages, i.e. the lower speed signal, minus one base-emitter drop and connects it to the negative input of circuit A1. For equal speed on lines 46a and 46b, the signal at the positive input of circuit A1 is more positive than the signal on the negative input of circuit A1 by two base-emitter drops, that is, approximately 1.2 volts. At a scaling factor of −50 mv/mph, 1.2 volts equals approximately 24 mph.

Whenever the signal on output lines 46a or 46b differ by more than 24 mph, the signal at the negative input of circuit A1 is more positive than the signal at the positive input of circuit A1. In that case, the output line 26 of circuit A1 changes from high impedance to low impedence to ground. Thus, when the difference between the two outputs of the wheel speed detectors 42a, 42b exceeds 24 mph, a sensor fallout signal is generated on output line 26 for connection to the timer 32 as previously described.

Other speed differences besides 24 mph may be used to trigger circuit A1 into generating a sensor fallout signal. The applicant has discovered that a speed difference between wheel speed detectors of as much as 24 mph rarely exists for short time periods except when the differences are due to sensor fallout. Consequently, the use of a 24 mph threshold as an indicator of sensor fallout is preferred.

Figure 5:
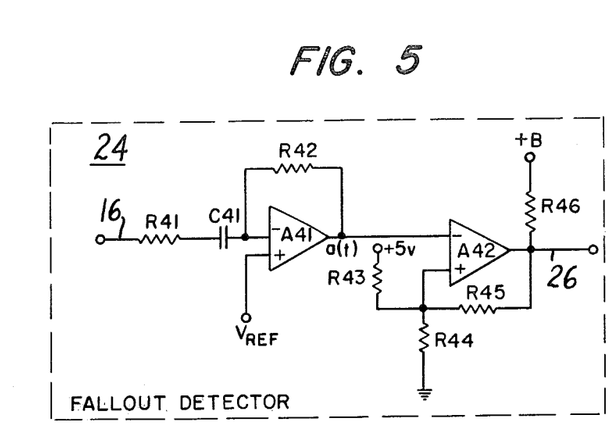
FIG. 5 shows a fallout detector sensitive to abnormally high deceleration.

Referring now to FIG. 5, there is shown a fallout detector 24 which is operative to generate a fallout signal upon the detection of abnormally high deceleration signals from one of the wheel speed detectors 42.

The varying dc signal on line 16 from the wheel speed sensor 14 is integrated in a circuit composed of R41, C41, A41 and R42 to yield a signal which is proportional to the acceleration in the wheel speed signal. The proportionality is conveniently equal to the $V_{ref}+100$ mv/g. For a voltage supply level of +5 volts, the $V_{ref}$ may be, for example, 2.5 volts. The acceleration signal is connected to the negative input of threshold circuit A42.

The resistive network on threshold circuit A42, composed of resistors R43, R44, R45 and R46, normally holds the output of circuit A42 at low impedance to ground and the voltage at the positive input of threshold circuit A42 suitably to about 0.5 volts. At a scaling factor of −100 mv/g from a quiescent value of +2.5 volts, the negative input of threshold circuit A42 reaches 0.5 volts when the input signal on line 16 exhibits a deceleration of 20 g's. At that point, the output of threshold circuit A42 changes from low impedance to ground to high impedance to ground. This causes the voltage at the positive input of threshold circuit A42 to change to 2.55 volts and thereby to latch the fallout signal on line 26. In order to reset threshold circuit A42, the high deceleration signal must be removed, and replaced by an acceleration signal of at least 0.05 volts, corresponding to at least 0.5 g's acceleration. It intuitively follows that, after an abnormally high deceleration, at least some acceleration must ensue. Therefore, it follows that a moderate threshold of 0.5 g's acceleration to cancel the fallout signal is readily attained following any 20 g's deceleration signal.

Figure 6:
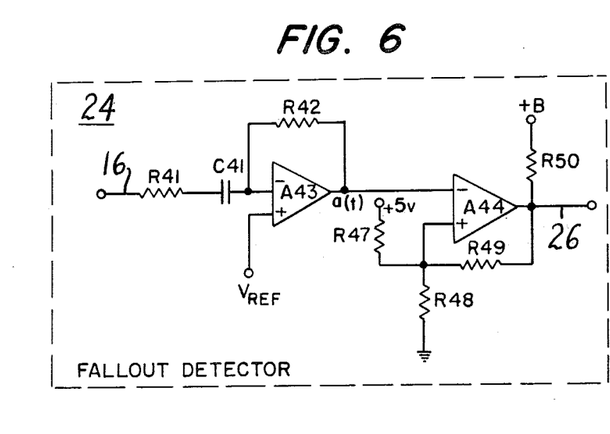
FIG. 6 shows a fallout detector sensitive to abnormally high acceleration.

A fallout detector 24 which is triggered by abnormally high acceleration is shown in FIG. 6. In this Figure, the circuit elements R41, C41, R42 and circuit A43 may be identically the same as those shown in FIG. 5. The output of this circuit is suitably variable with the acceleration of the wheel speed as for example 2.5 volts plus 100 mv/g.

The resistive divider comprised of R47, R48, R49 and R50 about circuit A44 normally holds the output line 26 at high impedance and the positive input at 4.5 volts. When the acceleration on line 16 is high enough to apply a signal at the negative input of threshold circuit A44 which is more positive than 4.5 volts, i.e. 20 g's, the output of threshold circuit A44 changes from high impedance to low impedance to ground thus reconfiguring the resistive divider to connect the junction of R50 and R49 to ground. In this configuration, the positive input to threshold circuit A44 drops to 2.55 volts using the values specified in the list of component values given later in the specification. After being triggered 2.55 volts persists at the positive input of A44 until the acceleration decreases sufficiently to lower the voltage at the negative input of threshold circuit A44 to below 2.55 volts. This occurs when the acceleration decreases to less than 0.5 g's.

The fallout detectors depending upon wheel speed difference as shown in FIG. 4, deceleration as shown in FIG. 5 and acceleration as shown in FIG. 6 may be used individually or in any combination in the fallout detector 24 of fault detector 10 shown in FIG. 1.

Although the system described in previous paragraphs has been specifically directed to an analog system in which voltages are stored and compared to determine whether or not various criteria are met, the system is equally applicable to digital circuits for the determination of satisfaction of system criteria. Suitably, digital circuits substitute the accumulation of numerals for the accumulation of voltages in the analog circuits. For example, timer 32 and memory 28 in FIG. 1 may be digital counters which are fed clock signals during the energization of solenoid 22 and whose thresholds are appropriately chosen to satisfy the stated criteria. In a digital circuit thus constructed as in FIG. 1, the existence of an output from fallout detector 24 inhibits the counting in timer 32 and thereupon may prevent the timer 32 from counting sufficient clock pulses to trigger memory reset 30 into resetting memory 28. The forgiveness circuit 38 in FIG. 1 may be similarly clocked at a reduced rate from the clock to decrement memory 28 at a relatively slow rate. In a digital system, threshold 34 stores a digital number which is compared against the number instantly stored in memory 28, and when the number in memory 28 exceeds the number stored in threshold 34, the output signal on output line 36 is enabled.

The following component values represent one practical embodiment reduced to practice and are not intended to be limiting as to the component values which may be used.

LIST OF COMPONENTS

| Resistors (K Ohms) | | Capacitors (microfarads) | |
| --- | --- | --- | --- |
| R1 | 100 | C1 | 1 |
| R2 | 100 | C2 | 10 |
| R3 | 1 | C41 | 0.27 |
| R4 | 20 | | |
| R5 | 20 | | |
| R6 | 10 | Transistors | |
| R7 | 20 | | |
| R8 | 20 | Q1 | PN 4250 |
| R9 | 3000 | Q2 | PN 4250 |
| R10 | 200 | Q3 | PN 3565 |
| R11 | 10 | Q4 | PN 3565 |
| R12 | 20 | Q5 | PN 3565 |
| R13 | 1 | Q6 | PN 4250 |
| R14 | 75 | Q7 | 2N 6027 |
| R15 | 51 | | |
| R41 | 20 | | |
| R42 | 343 | Integrated Circuits | |
| R43 | 412 | | |
| R44 | 84.5 | A1 | MC 3302 |
| R45 | 100 | A2 | MC 3302 |
| R46 | 1 | A42 | MC 3302 |
| R47 | 10 | A43 | MC 3302 |
| R48 | 52.3 | | |
| R49 | 13 | | |
| R50 | 1 | | |

It will be understood that the claims are intended to cover all changes and modifications of the preferred embodiments to the invention, herein chosen for the purpose of illustration which do not constitute departures from the spirit and scope of the invention.

What is claimed is:

1. A fault detector for a wheel slip control system, said wheel slip control system having at least one wheel speed sensor whose output is connected to a control circuit and a solenoid valve selectively energizeable by control signals from said control circuit under predetermined conditions, comprising:
    (a) memory means connected to said control signals for storing successive increments of signal during successive solenoid valve energizations;
    (b) output means for generating an output when the memory means attains a predetermined condition;
    (c) reset means actuated by the end of said control signals for erasing at least some of the signal stored in said memory means;
    (d) timer means for inhibiting said reset means until a predetermined time after the beginning of each of said control signals; and
    (e) fallout detector means connected to said at least one wheel speed sensor and generating a fallout signal for lengthening said predetermined time when the signal from said at least one wheel speed sensor exhibits sensor fallout.

2. The fault detector recited in claim 1 further comprising a forgiveness circuit for slowly removing the stored signal from said memory means.

3. The fault detector recited in claim 1 wherein said memory means is an analog storage member.

4. The fault detector recited in claim 1 wherein said predetermined time is more than 6 milliseconds.

5. The fault detector recited in claim 4 wherein said predetermined time is from about 6 to about 100 milliseconds.

6. The fault detector recited in claim 1 wherein said predetermined time comprises a first predetermined time after the beginning of each of said control signals and a second predetermined time after the end of said fallout signal which occurs during said control signal.

7. The fault detector recited in claim 6 wherein said first predetermined time is about 60 milliseconds and said second predetermined time is about 20 milliseconds.

8. The fault detector recited in claim 1 further comprising:
    (a) said at least one wheel speed sensor being at least first and second wheel speed sensors effective to generate first and second wheel speed signals respectively; and
    (b) comparison means for comparing the difference between said first and second wheel speed signals and for generating said fallout signal when said difference exceeds a predetermined amount.

9. The fault detector recited in claim 8 wherein said predetermined amount is about 24 miles per hour.

10. The fault detector recited in claim 8 wherein said comparison means comprises:
    (a) a select high circuit receiving said first and second wheel speed signals and being effective to connect to its output a signal varying in proportion to the higher speed signal;
    (b) a select low circuit receiving said first and second wheel speed signals and being effective to connect to its output a signal varying in proportion to the lower speed signal; and (c) comparison circuit means for comparing the outputs of the select high circuit and the select low circuit and for generating said fallout signal.

11. The fault detector recited in claim 1 or 8 wherein said fallout detector means further comprises:

(a) means for producing an acceleration signal varying in proportion to the acceleration of said at least one wheel speed sensor; and (b) threshold means for generating said fallout signal when said acceleration signal exceeds a predetermined value.

12. The fault detector recited in claim 11 further comprising means for maintaining said fallout signal until said acceleration signal is reduced to a second predetermined value smaller than said predetermined value.

13. The fault detector recited in claim 11 wherein said acceleration signal is a deceleration signal.

14. A fault detector for a wheel slip control system, said wheel slip control system having at least one wheel speed sensor operative to generate a wheel speed signal, said wheel speed signal being connected to a control circuit and a solenoid valve selectively energizeable by control signals from said control circuit under predetermined conditions comprising:

(a) a memory capacitor operative to store charge during energization of said solenoid valve;

(b) threshold circuit means for comparing the voltage stored in said memory capacitor with a threshold voltage and operative to generate an output signal when the stored voltage exceeds said threshold voltage;

(c) a reset circuit operative to discharge said memory capacitor at the end of energization of said solenoid valve;

(d) a timing capacitor connected to said reset circuit and operative to prevent operation of said reset circuit unless a predetermined voltage is stored therein at the end of energization of said solenoid valve;

(e) means for charging said timing capacitor during the energization of said solenoid valve and for discharging it during the deenergization of said solenoid valve;

(f) a sensor fallout detector connected to said wheel speed signal and operative to generate a fallout signal upon detecting sensor fallout; and (g) means in response to said fallout signal for limiting the voltage which may be stored in said timing capacitor to a value below said predetermined voltage.

15. The fault detector recited in claim 14 wherein said value is about zero volts.

16. The fault detector recited in claim 14 wherein said value is a second predetermined voltage greater than zero volts and less than said predetermined voltage and said means for charging being operative to charge said timing capacitor from said predetermined voltage to said predetermined voltage in no less than 6 milliseconds after removal of said fallout signal.

17. A method of detecting faults in a wheel slip control system comprising:

(a) storing increments of signal during actuation of said wheel slip control system;

(b) comparing the stored signal with a fixed threshold and generating an output signal when the stored signal exceeds said fixed threshold;

(c) erasing the stored signal at the end of actuation of said wheel slip control system;

(d) inhibiting the erasing if the actuation continues for less than a predetermined time; and (e) inhibiting the erasing if a sensor fallout exists within a second predetermined time before the end of actuation of said wheel slip control system.

18. The method recited in claim 17 wherein said second predetermined time is about zero.

19. The method recited in claim 17 wherein said second predetermined time is about 20 milliseconds.

20. The method recited in claim 17 wherein said predetermined time is from about 6 to about 100 milliseconds.

21. The method recited in claim 17 wherein said first predetermined time is about 40 milliseconds and said second predetermined time is about 10 milliseconds.

* * * * *